US010277916B2

(12) United States Patent
Takiue et al.

(10) Patent No.: US 10,277,916 B2
(45) Date of Patent: Apr. 30, 2019

(54) VIDEO PREDICTIVE ENCODING DEVICE AND SYSTEM, VIDEO PREDICTIVE DECODING DEVICE AND SYSTEM

(71) Applicant: NTT DOCOMO, INC., Tokyo (JP)

(72) Inventors: Junya Takiue, Tokyo (JP); Choong Seng Boon, Tokyo (JP); Thiow Keng Tan, Jalan Sindor (SG)

(73) Assignee: NTT DOCOMO, INC., Tokyo (JP)

( * ) Notice: Subject to any disclaimer, the term of this patent is extended or adjusted under 35 U.S.C. 154(b) by 240 days.

(21) Appl. No.: 14/588,760

(22) Filed: Jan. 2, 2015

(65) Prior Publication Data

US 2015/0110189 A1 Apr. 23, 2015

Related U.S. Application Data

(63) Continuation of application No. PCT/JP2013/064498, filed on May 24, 2013.

(30) Foreign Application Priority Data

Jul. 6, 2012 (JP) .................................. 2012-152700

(51) Int. Cl.
*H04N 19/503* (2014.01)
*H04N 19/70* (2014.01)
(Continued)

(52) U.S. Cl.
CPC ......... *H04N 19/503* (2014.11); *H04L 65/607* (2013.01); *H04L 69/22* (2013.01);
(Continued)

(58) Field of Classification Search
CPC .... H04N 19/503; H04N 19/107; H04N 19/61; H04N 19/70; H04L 65/607; H04L 69/22
See application file for complete search history.

(56) References Cited

U.S. PATENT DOCUMENTS

2005/0175098 A1* 8/2005 Narasimhan ....... H04N 21/2368
375/240.12
2006/0171600 A1* 8/2006 Kikuchi ............... G11B 27/005
382/232

(Continued)

FOREIGN PATENT DOCUMENTS

KR 10-2006-0068254 6/2006
KR 10-2009-004659 1/2009
(Continued)

OTHER PUBLICATIONS

Extended European Search Report, dated Jan. 18, 2016, pp. 1-11, issued in European Patent Application No. 13813437.4, European Patent Office, Munich, Germany.
(Continued)

*Primary Examiner* — Hung Q Dang
*Assistant Examiner* — Sunghyoun Park
(74) *Attorney, Agent, or Firm* — Brinks Gilson & Lione

(57) ABSTRACT

A video predictive encoding device includes an input module to receive pictures forming a video sequence, and an encoding module to encode the pictures by either intra prediction or inter prediction to generate compressed picture data, and to packetize the compressed image data along with packet header information. The packet header information includes a picture type. The encoding module determines the picture type so as to uniquely indicate whether encoded picture data is used for reference in decoding of another picture.

6 Claims, 10 Drawing Sheets

(51) Int. Cl.
  *H04N 19/61* (2014.01)
  *H04N 19/107* (2014.01)
  *H04L 29/06* (2006.01)
(52) U.S. Cl.
  CPC ........... *H04N 19/107* (2014.11); *H04N 19/61* (2014.11); *H04N 19/70* (2014.11)

(56) References Cited

U.S. PATENT DOCUMENTS

| | | | |
|---|---|---|---|
| 2006/0188225 A1* | 8/2006 | Yamakage | G11B 27/005 386/331 |
| 2007/0177672 A1* | 8/2007 | Yang | H04N 19/597 375/240.25 |
| 2008/0267287 A1* | 10/2008 | Hannuksela | H04N 21/4384 375/240.12 |
| 2010/0189182 A1* | 7/2010 | Hannuksela | H04N 21/234327 375/240.25 |
| 2011/0188571 A1* | 8/2011 | Maani | H04N 19/61 375/240.12 |
| 2012/0269275 A1* | 10/2012 | Hannuksela | H04N 13/0048 375/240.25 |
| 2013/0070859 A1* | 3/2013 | Lu | H04N 19/39 375/240.25 |
| 2013/0272618 A1* | 10/2013 | Deshpande | H04N 19/70 382/232 |

FOREIGN PATENT DOCUMENTS

| | | |
|---|---|---|
| WO | WO 2009/005302 A1 | 1/2009 |
| WO | WO 2012/049876 A1 | 4/2012 |

OTHER PUBLICATIONS

Haskell, B.G., et al., "MPEG Video Compression Basics," dated Aug. 25, 2011, pp. 7-38, Springer, New York, NY, XP055239295.

ITU-T H.264, Series H: Audiovisual and Multimedia Systems, Infrastructure of audiovisual services—Coding of moving video, Advanced video coding for generic audiovisual services, pp. 1-282, dated Mar. 1, 2005, Internet citation, Retrieved from the Internet at URL: www.itu.int/rec/T-REC-H.264/en International Telecommunication Union, Geneva, Switzerland. XP008095420.

Tan, H.K., et al., "On nal_ref_flag," Jul. 6, 2012, Joint Collaborative Team on Video Coding (JCT-VC) of ITU-T SG16 WP3 and ISO/IEC JTC 1/SC 29/WT 11 10th Meeting, Stockholm, Sweden XP030053891.

Canadian Office Action, dated Feb. 26, 2016, pp. 1-5, issued in Canadian Patent Application No. 2,874,816, Canadian Intellectual Property Office, Gatineau, Quebec, Canada.

ITU-T H.264, Series H: Audiovisual and Multimedia Systems, Infrastructure of audiovisual services—Coding of moving video, Advanced video coding for generic audiovisual services, with Corrigendum 1, approved Sep. 2005, pp. 1-324, (Mar. 2005) Internet citation, Retrieved from the Internet at URL: www.itu.int/rec/T-REC-H.264/en International Telecommunication Union, Geneva, Switzerland.

Australian Office Action, dated Mar. 18, 2016, pp. 1-3, issued in Australian Patent Application No. 2013284741, Australia Patent Office, Woden ACT, Australia.

Korean Office Action, dated Feb. 17, 2016, pp. 1-8, issued in Korean Patent Application No. 10-2014-7032908, Korean Intellectual Property Office, Daejeon, Republic of Korea.

Russian Office Action with English translation, dated Mar. 2, 2016, pp. 1-16, issued in Russian Patent Application No. 2015103932/08 (006158), Rospatent, Moscow, Russia.

Korean Office Action with English translation, dated Aug. 4, 2016, pp. 1-5, issued in Korean Patent Application No. 10-2014-7032908, Korean Intellectual Property Office, Daejeon, Republic of Korea.

Korean Office Action with English translation, dated Oct. 6, 2016, pp. 1-7, issued in Korean Patent Application No. 10-2016-7023910, Korean Intellectual Property Office, Daejeon, Republic of Korea.

Taiwan Office Action with English translation, pp. 1-13, dated Mar. 24, 2015, issued in Taiwan Patent Application No. 102120523, Taiwan Intellectual Property Office, Taipei City, Taiwan, Republic of China.

Notice of Decision to Grant a Patent with English translation, dated Jan. 19, 2016, pp. 1-6, issued in Japanese Patent Application No. P2012-152700 (now Japanese Patent No. 5885604), Japanese Patent Office, Tokyo, Japan.

Office Action, and English language translation thereof, in corresponding Chinese Application No. 201380034333.X, dated Jan. 18, 2017, 17 pages.

Wenger, S. et al., "RTP Payload Format for Scalable Video Coding", *RTP Payload Format for Scalable Video Coding; RFC6190.Txt, Internet Engineering Task Force, Ietf: Standard, Internet Society (ISOC)* 4, Rue Des Falaises Ch-1205 Geneva, Switzerland, May 7, 2011, XP015075999, pp. 1-100.

Office Action in corresponding European Application No. 13813437.4, dated Jan. 31, 2017, 6 pages.

Office Action in European Application No. 13813437.4 dated Jul. 5, 2018, pp. 1-17.

Office Action in Korean Application No. 10-2014-7032908 dated Jun. 22, 2018, pp. 1-28.

Office Action in Canada Application No. 2,974,736, dated Jul. 26, 2018, pp. 1-5.

ITU-T H.264, "ITU-T Recommendation H.264: Advanced Video Coding for Generic Audio Visual Services", Series H: Audio Visual and Multimedia System Infrastructure of Audio Visual Services—Coding of Moving Video, *International Telecommunication* Union, 2003, 282 pages.

Office Action in corresponding Australian Application No. 2016201427, dated Jul. 20, 2017, 3 pages.

Office Action in corresponding European Application No. 13813437.4, dated Jan. 3, 2018, 8 pages.

Bross, B., Han, W.J., Ohm, J.R., Sullivan, G.J., Wiegand, T., "Joint Collaborative Team on Video Coding (JCT-VC) of ITU-T SG16 WP3 and ISO/IEC JTC1/SC29/WG11," pp. 1-280, 9th Meeting, Geneva, Switzerland, Apr. 27-May 7, 2012.

International Search Report with English Translation, dated Aug. 27, 2013, pp. 1-5, issued in International Application No. PCT/JP2013/064498, Japanese Patent Office, Tokyo, Japan.

International Preliminary Report on Patentability, dated Jan. 15, 2015, pp. 1-6, issued in International Application No. PCT/JP2013/064498, The International Bureau of WIPO, Geneva, Switzerland.

Office Action dated Feb. 18, 2019 for Korean Application No. 10-2018-7036763, 7 pages.

Office Action dated Feb. 18, 2019 for Korean Application No. 10-2018-7036764, 7 pages.

* cited by examiner

VIDEO PREDICTIVE ENCODING DEVICE AND SYSTEM, VIDEO PREDICTIVE DECODING DEVICE AND SYSTEM

PRIORITY

This application is a continuation of PCT/JP2013/064498, filed May 24, 2013, which claims the benefit of the filing date pursuant to 35 U.S.C. § 119 of JP2012-152700, filed Jul. 6, 2012, both of which are incorporated herein by reference.

TECHNICAL FIELD

The present disclosure relates to a video predictive coding system that includes a video predictive encoding device that can perform a video predictive encoding method and that can include a video predictive encoding program; and a video predictive decoding device that can perform a video predictive decoding method and that can include a video predictive decoding program.

BACKGROUND ART

In the conventional video compression technology, a bit stream is encapsulated in a network abstraction layer (NAL) unit. The NAL unit provides a self-contained packet and gives a video layer identity in different network environments. A header of the NAL unit contains information used in a system layer. The header of the NAL unit becomes a part of the packet header used in a packet network, and is designed to operate by media aware network elements (MANEs).

The NAL unit header in the conventional technology includes the following syntax elements: nal_ref_flag which indicates whether the NAL unit is used for reference in a decoding process of another NAL unit; nal_unit_type which indicates a type of a content transmitted by the NAL unit, where the NAL unit contains information such as a parameter set, a coded slice, or a supplemental enhancement information (SEI) message; and temporal_id which indicates a temporal_identifier of the NAL unit.

SUMMARY

Media aware network elements (MANEs) are designed to check the minimum number of bytes in the header of a packet, the network abstraction layer (NAL) unit header is a limited resource. In some examples, the NAL unit header is limited to only 2 bytes. For this reason, all syntax elements of the NAL unit header can be important and should transmit as much information as possible, and be unrelated to the other syntax elements.

In NAL unit types, an nal_ref_flag can be set at a fixed value, and thus an nal_ref_flag may not be needed. In an example, such as described in Benjamin Bross et al., "High efficiency video coding (HEVC) text specification draft 7," Joint Collaborative Team on Video Coding (JCT-VC) of ITU-T SG16 WP3 and ISO/IEC JTC1/SC29/WG11, 9th Meeting: Geneva, CH, 27 Apr.-7 May 2012, there can be only three kinds of NAL unit types having a nal_ref_flag that can be a value of either 0 or 1, whereas the value of nal_ref_flag for other NAL unit types is fixed. An example is shown in Table 1.

TABLE 1

| NAL unit type range | Possible nal_ref_flag | Fixed/Variable nal_ref_flag |
|---|---|---|
| 1 to 3 | 0 or 1 | Variable |
| 4 to 8 | 1 | Fixed |
| 25 to 28 | 1 | Fixed |
| 29 to 31 | 0 | Fixed |

Table 1 shows correspondence between the values of nal_unit_type (NAL unit type range column) and the possible values of the nal_ref_flag (Possible nal_ref_flag column). In this example, the NAL unit types of nal_unit_type can have values of 1, 2, or 3 and the corresponding values of nal_ref_flag can have values of 0 or 1. The remaining NAL unit types can have corresponding values for the nal_ref_flag that are fixed (reserved), or not specified.

Although the value of nal_ref_flag can be uniquely determined according to the value of nal_unit_type as described above, this technique can assign respective bits to nal_ref_flag and nal_unit_type, resulting in an inefficient design.

An example solution to eliminate this inefficiency is for a video predictive coding system to infer the value of nal_ref_flag from the NAL unit type, without explicitly sending nal_ref_flag in the NAL unit header. For example, three NAL unit types in which it is inferred that nal_ref_flag is 1 can be added to the three NAL unit types, the content of which can be a reference picture or a non-reference picture. For the original three NAL unit types, it can be inferred that nal_ref_flag is 0.

A video predictive coding system can include a video predictive encoding device according to an embodiment that includes input means that inputs a plurality of pictures forming a video sequence; and encoding means which encodes the pictures by either intra prediction or inter prediction to generate compressed picture data, and which packetizes the compressed picture data along with packet header information, wherein the packet header information contains a picture type, and wherein the encoding means determines the picture type so as to uniquely indicate whether encoded picture data is used for reference in decoding of another picture. An encoding means of a video predictive encoding device according to an embodiment determines the picture type so as to uniquely indicate whether encoded picture data is used for reference in decoding of another picture in the same temporal layer.

A video predictive coding system can include a video predictive decoding device according to an embodiment that includes input means which inputs compressed picture data resulting from encoding of a plurality of pictures forming a video sequence by either intra prediction or inter prediction and packetization of the compressed picture data with packet header information; and decoding means which reconstructs the packet header information and the compressed picture data, wherein the packet header information contains a picture type uniquely indicating whether reconstructed picture data is used for reference in decoding of another picture, and wherein the decoding means determines, based on the picture type, whether reconstructed picture data is used for reference in decoding of another picture.

In the video predictive decoding device according to an embodiment, the decoding means determines whether reconstructed picture data is used for reference in decoding of another picture, based on a correspondence table in which the picture type is previously stored in association with information indicative of whether reconstructed picture data is used for reference in decoding of another picture. A decoding means of a video predictive decoding device according to an embodiment determines, based on the picture type, whether reconstructed picture data is used for reference in decoding of another picture in the same temporal layer.

A video predictive encoding method according to an embodiment is a video predictive encoding method comprising: an input step of inputting a plurality of pictures forming a video sequence; and an encoding step of encoding the pictures by either intra prediction or inter prediction to generate compressed picture data, and packetizing the compressed picture data with packet header information, wherein the packet header information contains a picture type, and wherein the encoding step determines the picture type so as to uniquely indicate whether encoded picture data is used for reference in decoding of another picture. An encoding step of a video predictive encoding method according to an embodiment determines the picture type so as to uniquely indicate whether encoded picture data is used for reference in decoding of another picture in the same temporal layer.

A video predictive decoding method according to an embodiment is a video predictive decoding method comprising: an input step of inputting compressed picture data resulting from encoding of a plurality of pictures forming a video sequence by either intra prediction or inter prediction and packetization of the compressed picture data with packet header information; and a decoding step of reconstructing the packet header information and the compressed picture data as reconstructed picture data, wherein the packet header information contains a picture type uniquely indicating whether the reconstructed picture data is used for reference in decoding of another picture, and wherein the decoding step determines, based on the picture type, whether reconstructed picture data is used for reference in decoding of another picture.

In the video predictive decoding method according to an embodiment the decoding step determines whether reconstructed picture data is used for reference in decoding of another picture, based on a correspondence table in which the picture type is previously stored in association with information indicative of whether reconstructed picture data is used for reference in decoding of another picture. A decoding step of a video predictive decoding method according to an embodiment determines, based on the picture type, whether reconstructed picture data is used for reference in decoding of another picture in the same temporal layer.

A video predictive encoding program according to an embodiment is a video predictive encoding program comprising: an input module which inputs a plurality of pictures forming a video sequence; and an encoding module which encodes the pictures by either intra prediction or inter prediction to generate compressed picture data, and which packetizes the compressed picture data along with packet header information, wherein the packet header information contains a picture type, and wherein the encoding module determines the picture type so as to uniquely indicate whether encoded picture data is used for reference in decoding of another picture. An encoding module of a video predictive encoding program according to an embodiment determines the picture type so as to uniquely indicate whether encoded picture data is used for reference in decoding of another picture in the same temporal layer.

A video predictive decoding program according to an embodiment is a video predictive decoding program comprising: an input module which inputs compressed picture data resulting from encoding of a plurality of pictures forming a video sequence by either intra prediction or inter prediction and packetization of the compressed picture data with packet header information; and a decoding module which reconstructs the packet header information and the compressed picture data, wherein the packet header information contains a picture type uniquely indicating whether reconstructed picture data is used for reference in decoding of another picture, and wherein the decoding module determines, based on the picture type, whether reconstructed picture data is used for reference in decoding of another picture.

In the video predictive decoding program according to an embodiment the decoding module determines whether reconstructed picture data is used for reference in decoding of another picture, based on a correspondence table in which the picture type is previously stored in association with information indicative of whether reconstructed picture data is used for reference in decoding of another picture. A decoding module of a video predictive decoding program according to an embodiment determines, based on the picture type, whether reconstructed picture data is used for reference in decoding of another picture in the same temporal layer.

Use of the video predictive coding system can result in savings of the number of bits used for nal_ref_flag, and enable use thereof as other indication information. This results in a more efficient utilization of the NAL unit header. In another embodiment, extension of the NAL unit types from 6 bits to 7 bits is enabled. In an example, the existing NAL unit types are assigned to half of 64 values of nal_unit_type available and the other 32 values of nal_unit_type are reserved, and can be used in defining new NAL unit types in the future. By using three of these reserved values of NAL unit types, and extending the bit count of the NAL unit types to 7 bits, it becomes feasible to define 93 (128−32−3=93) further NAL units in the future.

Other systems, methods, features and advantages will be, or will become, apparent to one with skill in the art upon examination of the following figures and detailed description. It is intended that all such additional systems, methods, features and advantages be included within this description, be within the scope of the disclosure, and be protected by the following claims.

DESCRIPTION OF EMBODIMENTS

Embodiments of the video predictive coding system will be described below with reference to FIGS. 1 to 10.

Figure 1:
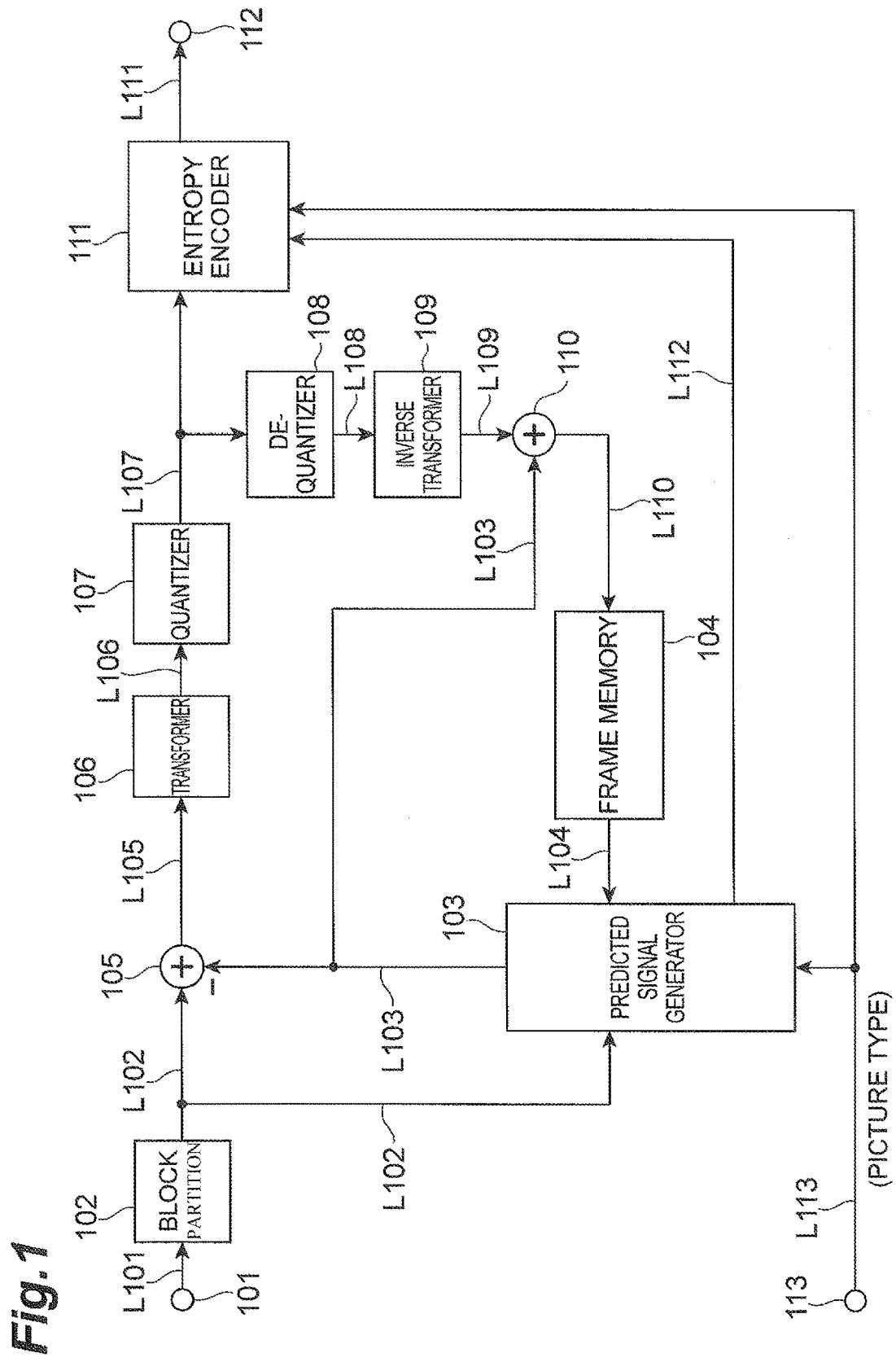
FIG. 1 is a block diagram showing an example of a video predictive encoding device according to an embodiment.

First, a video predictive encoding method will be described. FIG. 1 is a block diagram showing an example of a video predictive encoding device according to an embodiment of the predictive video coding system. Reference numeral 101 denotes an input terminal, 102 a block partition module, 103 a predicted signal generation module, 104 a frame memory, 105 a subtraction module, 106 a transform module, 107 a quantization module, 108 a de-quantization module, 109 an inverse transform module, 110 an addition module, 111 an entropy encoding module, 112 an output terminal, and 113 an input terminal. The input terminal 101 corresponds to an input module. The subtraction module 105, transform module 106, quantization module 107, and entropy encoding module 111 correspond to an encoding module. The de-quantization module 108, inverse transform module 109, and addition module 110 correspond to a decoding module. As used herein, the term "module" describes hardware that may also execute software to perform the described functionality. The video predictive encoding device may be a computing device or computer, including circuitry in the form of hardware, or a combination of hardware and software, capable of performing the described functionality. The video predictive encoding device may be one or more separate systems or devices included in the video predictive coding system, or may be combined with other systems or devices within the video predictive coding system. In other examples, fewer or additional modules may be used to illustrate the functionality of the predictive video encoding device.

Concerning the video predictive encoding device configured as described above, the operation thereof will be described below. A video signal consisting of a plurality of pictures is fed to the input terminal 101. A picture of an encoding target is partitioned into a plurality of regions by the block partition module 102. In an embodiment of the predictive coding system, the target picture is partitioned into blocks each consisting of 8×8 pixels, but it may be partitioned into blocks of any size or shape other than the foregoing. A predicted signal is then generated for a region as a target of an encoding process (which will be referred to hereinafter as a target block). An embodiment of the predictive coding system can employ two types of prediction methods. Namely, the two types of prediction methods are inter prediction and intra prediction.

In the inter prediction, reconstructed pictures having been encoded and thereafter reconstructed are used as reference pictures and motion information to provide the predicted signal with the smallest error from the target block is determined from the reference pictures. This process is called motion estimation. Depending upon the situation, the target block may be further partitioned into sub-regions and an inter prediction method can be determined for each of the sub-regions. In this case, the most efficient partition method for the entire target block and motion information of each sub-region are determined out of various partition methods. In embodiments, the operation is carried out in the predicted signal generation module 103, the target block is fed via line L102, and the reference pictures are fed via line L104. The reference pictures to be used herein are a plurality of pictures which have been encoded and reconstructed in the past. The details of encoding and reconstruction can be, for example, the same as in the methods of MPEG-2 or 4 and H.264, which are the conventional technologies. The motion information and sub-region partition method determined as described above are fed via line L112 to the entropy encoding module 111 to be encoded thereby, and then the encoded data is output from the output terminal 112. Information (reference index) indicating from which reference picture the predicted signal is derived out of the plurality of reference pictures is also sent via line L112 to the entropy encoding module 111. The predicted signal generation module 103 derives reference picture signals from the frame memory 104, based on the reference pictures and motion information, corresponding to the sub-region partition method and each sub-region, and generates the predicted signal. The inter-predicted signal generated in this manner is fed via line L103 to the subtraction module 105.

In intra prediction, an intra-predicted signal is generated using reconstructed pixel values spatially adjacent to the target block. Specifically, the predicted signal generation module 103 derives reconstructed pixel signals in the same frame from the frame memory 104 and extrapolates these signals to generate the intra-predicted signal. The information about the method of extrapolation is fed via line L112 to the entropy encoding module 111 to be encoded thereby, and then the encoded data is output from the output terminal 112. The intra-predicted signal generated in this manner is fed to the subtraction module 105. The method of generating the intra-predicted signal in the predicted signal generation module 103 can be, for example, the same as the method of H.264, which is the conventional technology. The predicted signal with the smallest error is selected from the inter-predicted signals obtained as described above, and the selected predicted signal is fed to the subtraction module 105.

The subtraction module 105 subtracts the predicted signal (fed via line L103) from the signal of the target block (fed via line L102) to generate a residual signal. This residual signal is transformed by a discrete cosine transform by the transform module 106 to form transform coefficients, which are quantized by the quantization module 107. Finally, the entropy encoding module 111 encodes the quantized transform coefficients and the encoded data is output along with the information about the prediction method from the output terminal 112.

For the intra prediction or the inter prediction of the subsequent target block, the compressed signal of the target block is subjected to inverse processing in order to be reconstructed. Namely, the quantized transform coefficients are inversely quantized by the de-quantization module 108 and then transformed using an inverse discrete cosine transform by the inverse transform module 109, to reconstruct a residual signal. The addition module 110 adds the reconstructed residual signal to the predicted signal fed via line L103 to reconstruct a signal of the target block and the reconstructed signal is stored in the frame memory 104. The present embodiment employs the transform module 106 and the inverse transform module 109, but it is also possible in other embodiments to use other transform processing instead of these transform modules. Depending upon the situation, in some embodiments the transform module 106 and the inverse transform module 109 may be omitted.

Input data from the input terminal 113 includes display order information of each picture, a type of encoding of each picture (intra predictive encoding, inter predictive encoding, or bidirectional predictive encoding), and information about the NAL unit type, and the predicted signal generation module 103 operates based on these pieces of information. These pieces of information are also fed via line L113 to the entropy encoding module 111 to be encoded thereby, and the encoded data is output from the output terminal 112. The operation of the entropy encoding module 111 for encoding of the NAL unit type will be described later.

Figure 2:
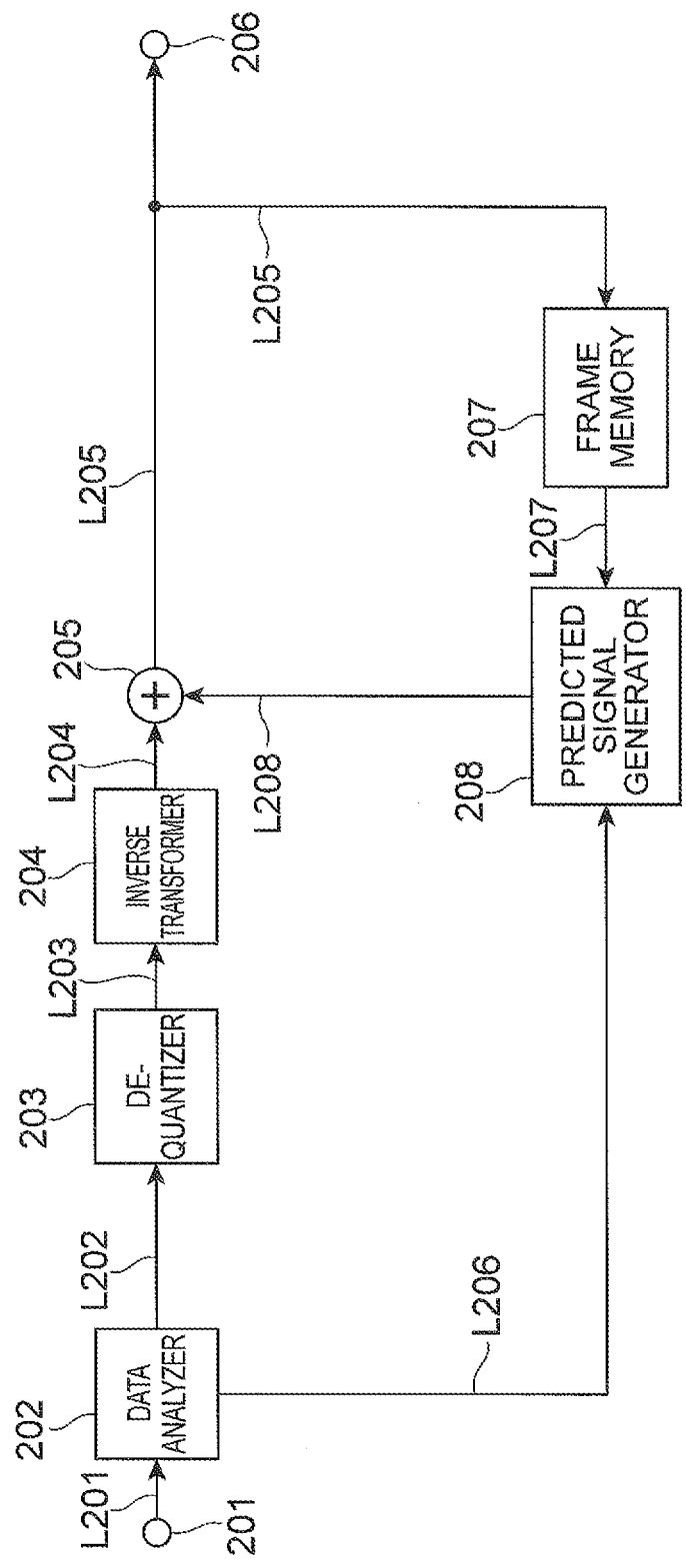
FIG. 2 is a block diagram showing an example of a video predictive decoding device according to an embodiment.

Next, a video predictive decoding method will be described. FIG. 2 is a block diagram showing a video predictive decoding device according to an embodiment of the predictive video coding system. Reference numeral 201 denotes an input terminal, 202 a data analysis module, 203 a de-quantization module, 204 an inverse transform module, 205 an addition module, 206 an output terminal, 207 a frame memory, 208 a predicted signal generation module, and 209 a frame memory management module. The input terminal 201 corresponds to an input module. The data analysis module 202, de-quantization module 203, inverse transform module 204, and addition module 205 correspond to a decoding module. In other embodiments, the decoding module may be means other than the foregoing. Furthermore, in embodiments the decoding module may be configured without the inverse transform module 204. The video predictive decoding device may be a computing device or computer, including circuitry in the form of hardware, or a combination of hardware and software, capable of performing the described functionality. The video predictive decoding device may be one or more separate systems or devices included in the video predictive coding system, or may be combined with other systems or devices within the video predictive coding system. In other examples, fewer or additional modules may be used to illustrate the functionality of the predictive video decoding device.

Concerning the video predictive decoding device configured as described above, the operation thereof will be described below. Compressed data resulting from compression encoding by the video predictive encoding device is input through the input terminal 201. This compressed data contains the residual signal resulting from predictive encoding of each target block obtained by partitioning of a picture into a plurality of blocks, and the information related to the generation of the predicted signal. The information related to the generation of the predicted signal includes, in addition to the NAL unit type, the information about block partitioning (size of block), the motion information, and the aforementioned reference index in the case of the inter prediction, and includes the information about the extrapolation method from reconstructed surrounding pixels in the case of the intra prediction.

The data analysis module 202 extracts the residual signal of the target block, the information related to the generation of the predicted signal including the NAL unit type, the quantization parameter, and the display order information of the picture from the compressed data. The operation for extraction of the NAL unit type in the data analysis module 202 will be described later. The residual signal of the target block is inversely quantized on the basis of the quantization parameter (fed via line L202) by the de-quantization module 203. The result is transformed by an inverse discrete cosine transform by the inverse transform module 204.

Next, the information related to the generation of the predicted signal such as the display order information of the target picture, the encoding type of the picture, the NAL unit type, and the reference index is fed via line L206 to the predicted signal generation module 208. The predicted signal generation module 208 accesses the frame memory 207, based on the information related to the generation of the predicted signal, to derive a reference signal from a plurality of reference pictures (via line L207) and generate a predicted signal. This predicted signal is fed via line L208 to the addition module 205, the addition module 205 adds this predicted signal to the reconstructed residual signal to reconstruct a target block signal, and the signal is output via line L205 from the output terminal 206 and simultaneously stored into the frame memory 207.

Reconstructed pictures to be used for decoding and reconstruction of the subsequent picture are stored in the frame memory 207.

Table 2 and Table 3 are tables indicating example of choices of two types of syntaxes concerning use modes of two bytes of the NAL unit header.

TABLE 2

|  | Descriptor |
|---|---|
| nal_unit( NumBytesInNALunit ) { | |
|     forbidden_zero_bit | f(1) |
|     reserved | u(1) |
|     nal_unit_type | u(6) |
|     temporal_id | u(3) |
|     reserved_one_5bits | u(5) |
|     .... (The rest of the NAL unit) | |

TABLE 3

|  | Descriptor |
|---|---|
| nal_unit( NumBytesInNALunit ) { | |
|     forbidden_zero_bit | f(1) |
|     nal_unit_type | u(7) |
|     temporal_id | u(3) |
|     reserved_one_5bits | u(5) |
|     .... (The rest of the NAL unit) | |

In Tables 2 and 3, numbers in parentheses in the Descriptor column indicate bit counts of corresponding items.

In the NAL unit header syntax of Table 2, nal_ref_flag is replaced by a reserved bit (reserved). This bit is ignored by currently existing decoding devices, but it can be assigned a new meaning or semantics for future decoding devices. It is noted that the bit arrangement in Table 2 is just for description and the reserved bit may be located at another location in the 2-byte header.

In the NAL unit header syntax of Table 3, nal_unit_type is assigned 7 bits and at most 128 different kinds of nal_unit_type can be defined thereby. In the present embodiment the assignment of 7 bits to nal_unit_type was selected, but the bit saved in nal_ref_flag may be assigned to another location, such as temporal_id.

Table 4 shows an example of the NAL unit types in an embodiment.

TABLE 4

| nal_unit_type | Category | Content of NAL unit and RBSP syntax structure | nal_ref_flag |
|---|---|---|---|
| 0 | | Unspecified | — |
| 1 | Other slice | Coded slice of a non-RAP, non-TFD and non-TLA picture slice_layer_rbsp( ) | 0 |
| 2 | TFD slice | Coded slice of a TFD picture slice_layer_rbsp( ) | 0 |
| 3 | TLA slice | Coded slice of a non-TFD TLA picture slice_layer_rbsp( ) | 0 |
| 4 | RAP slice | Coded slice of a CRAT picture slice_layer_rbsp( ) | 1 |
| 5 | RAP slice | Coded slice of an CRANT picture slice_layer_rbsp( ) | 1 |
| 6 | RAP slice | Coded slice of a BLCT picture slice_layer_rbsp( ) | 1 |
| 7 | RAP slice | Coded slice of a BLCNT picture slice_layer_rbsp( ) | 1 |
| 8 | RAP slice | Coded slice of an IDR picture slice_layer_rbsp( ) | 1 |
| 9 | Other slice | Coded slice of a non-RAP, non-TFD and non-TLA picture slice_layer_rbsp( ) | 1 |
| 10 | TFD slice | Coded slice of a TFD picture slice_layer_rbsp( ) | 1 |
| 11 | TLA slice | Coded slice of a non-TFD TLA picture slice_layer_rbsp( ) | 1 |
| 12 . . . 24 | | Reserved | — |
| 25 | Parameter Set | Video parameter set video_parameter_set_rbsp( ) | 1 |
| 26 | Parameter Set | Sequence parameter set seq_parameter_set_rbsp( ) | 1 |
| 27 | Parameter Set | Picture parameter set pic_parameter_set_rbsp( ) | 1 |
| 28 | Parameter Set | Adaptation parameter set aps_rbsp( ) | 1 |
| 29 | Information | Access unit delimiter access_unit_delimiter_rbsp( ) | 0 |
| 30 | Information | Filler data filler_data_rbsp( ) | 0 |
| 31 | Information | Supplemental enhancement information (SEI) sei_rbsp( ) | 0 |
| 32 . . . 47 | | Reserved | — |
| 48 . . . 63 | | Unspecified | — |

Table 4 is showing values of nal_ref_flag estimated from the values of nal_unit_type. The NAL unit types can be grouped into a plurality of categories, an example of which is shown in the second column of Table 4. The example categories are as described below.

1) RAP slice: NAL unit including a coded slice of a random access picture.
2) TLA slice: NAL unit including a coded slice of temporal layer access.
3) TFD slice: NAL unit including a coded slice of a picture tagged for discard.
4) Other slice: NAL unit including a coded slice except for the above slices 1)-3).
5) Parameter set: NAL unit including a video, sequence, picture, or adaptation parameter set.
6) Information: NAL unit including an access delimiter, filler data, or supplemental enhancement information (SEI).

In the present embodiment, three new kinds of NAL unit types corresponding to 9, 10, and 11 as values of nal_unit_type (picture types) are added to nal_unit_type in the conventional technology. The NAL units with these values of nal_unit_type include the same slice types as the NAL units with the respective values of nal_unit_type of 1, 2, and 3. nal_unit_type: 1 includes a coded slice of a non-RAP, non-TFD, and non-TLA picture, nal_unit_type: 2 includes a coded slice of a TFD picture, and nal_unit_type: 3 includes a coded slice of a non-TFT picture and a TLA picture.

The present embodiment is different from the conventional technology in that the values 1, 2, and 3 are the coded slices belonging to non-reference pictures and the values 9, 10, and 11 are the coded slices belonging to reference pictures.

The values assigned to the respective categories are not limited to those described above. Furthermore, each category may be extended to some sub-categories and these sub-categories may be assigned new values, using the reserved values in Table 4.

Figure 3:
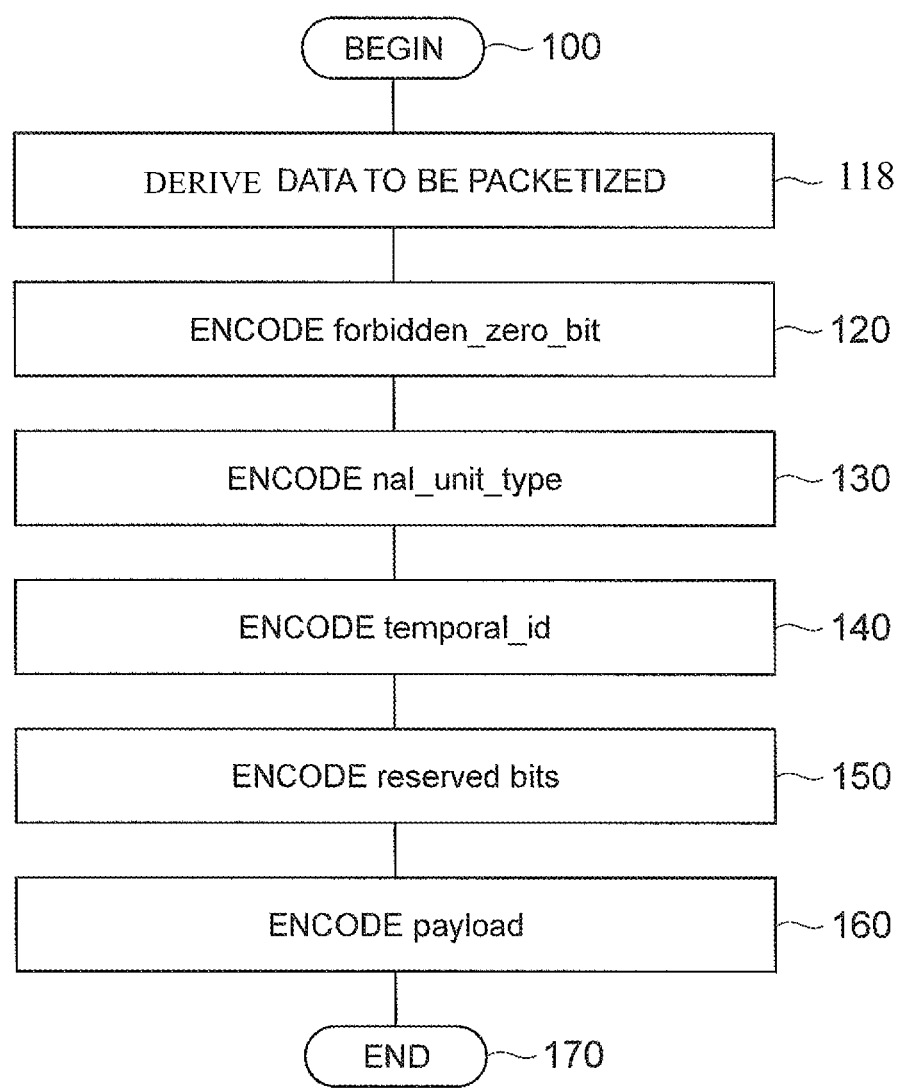
FIG. 3 is a flowchart showing an example of processing of a video predictive encoding method according to an embodiment.

FIG. 3 shows an example of the operation of the video predictive encoding device for encoding of the NAL unit header in the present embodiment. In step 118, the video predictive encoding device derives video data to be packetized. In step 120, the device encodes the first bit of the NAL unit always fixed to 0. In step 130, the device determines nal_unit_type and encodes it. In step 140 the device encodes temporal_id, and in step 150 the device encodes reserved five bits (reserved_one_5 bits), completing the NAL unit header. In step 160, the device packetizes the remaining payload (payload) and terminates the processing.

Figure 4:
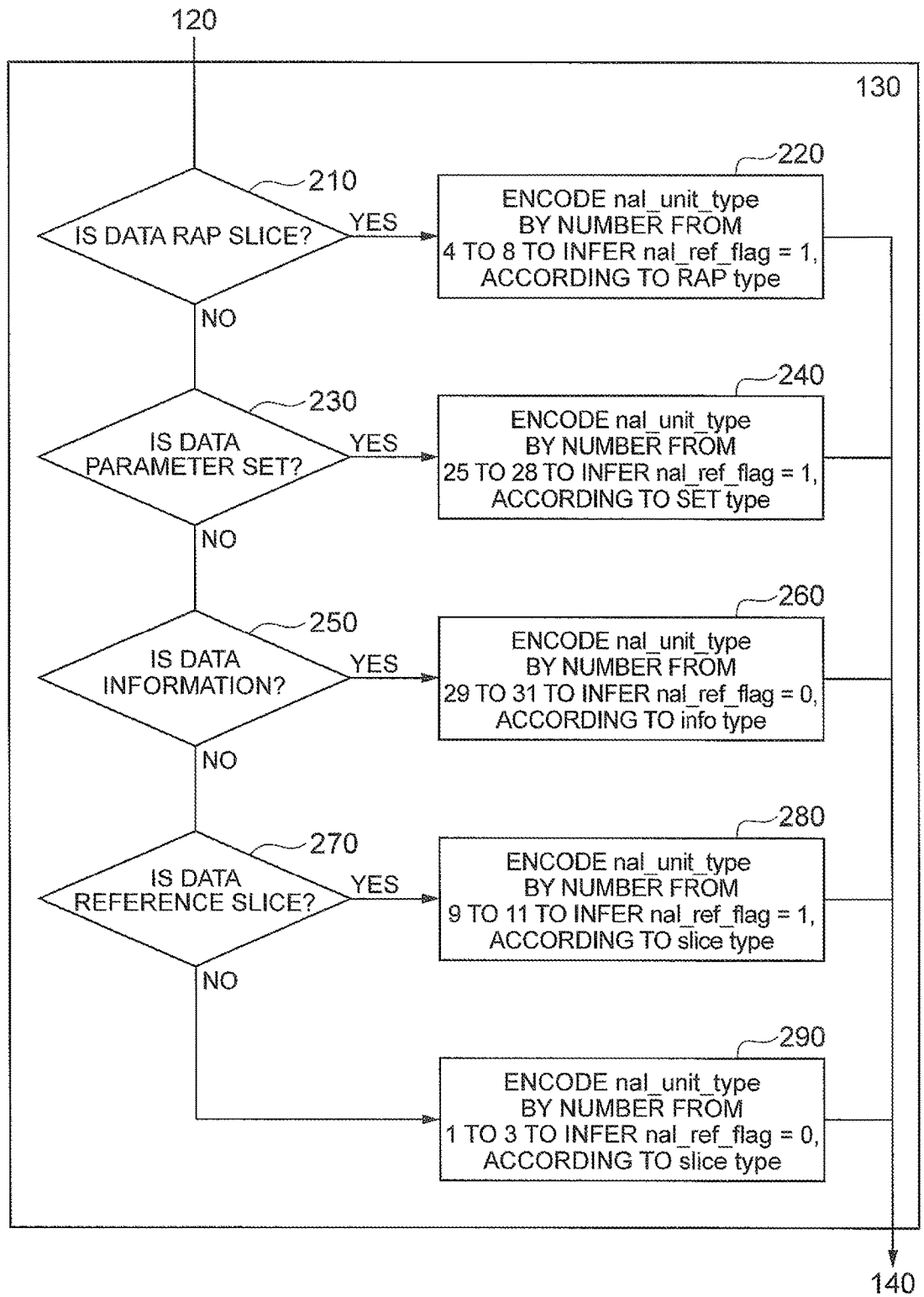
FIG. 4 is a flowchart showing an example of a detailed part of processing of the video predictive encoding method according to an embodiment.

FIG. 4 shows the details of an example of a process in the determination and encoding of nal_unit_type in step 130 above.

In step 210, the video predictive encoding device determines whether the data to be packetized is a coded slice belonging to any one of random access pictures (RAPs); when the data is a coded slice belonging to any one of RAPs (YES), the device goes to step 220. If not (NO) the device goes to step 230.

In step 220, the video predictive encoding device encodes nal_unit_type by a number from 4 to 8 to infer that nal_ref_flag is 1, according to the RAP type, and then moves to step 140.

In step 230, the video predictive encoding device determines whether the data to be packetized is a parameter set, and when the data is determined to be a parameter set (YES), the device moves to step 240. If the data is not a parameter set (NO), the device moves to step 250.

In step 240, the video predictive encoding device encodes nal_unit_type by a number from 25 to 28 to infer that nal_ref_flag is 1, according to the parameter set, and then the device moves to step 140.

In step 250, the video predictive encoding device determines whether the data to be packetized is information data, and when the data is information data (YES), the device moves to step 260. If not (NO) the device moves to step 270.

In step 260, the video predictive encoding device encodes nal_unit_type by a number from 29 to 31 to infer that nal_ref_flag is 0, according to the information type, and then moves to step 140.

In step 270, the video predictive encoding device determines whether the data to be packetized is a reference picture, and when the data is a reference picture (YES), the device moves to step 280. If the data is not a reference picture (NO), the device moves to step 290. The determination of whether or not the data is a reference picture is made based on the reference information between pictures output from the predicted signal generation module.

The conditional branching in step 270 may be arranged as follows. In step 270 the video data can be determined as either a reference picture or a non-reference picture. In step 270 the video predictive encoding device determines whether the picture is a reference picture, and when the picture is a reference picture (YES), the device moves to step 280. If the picture is not a reference picture (NO), the device moves to step 290.

In step 280, the video predictive encoding device encodes nal_unit_type by a number from 9 to 11 to infer that nal_ref_flag is 1, according to the slice type, and then moves to step 140.

In step 290, the video predictive encoding device encodes nal_unit_type by a number from 1 to 3 to infer that nal_ref_flag is 0, according to the slice type, and then the device moves to step 140.

Figure 5:
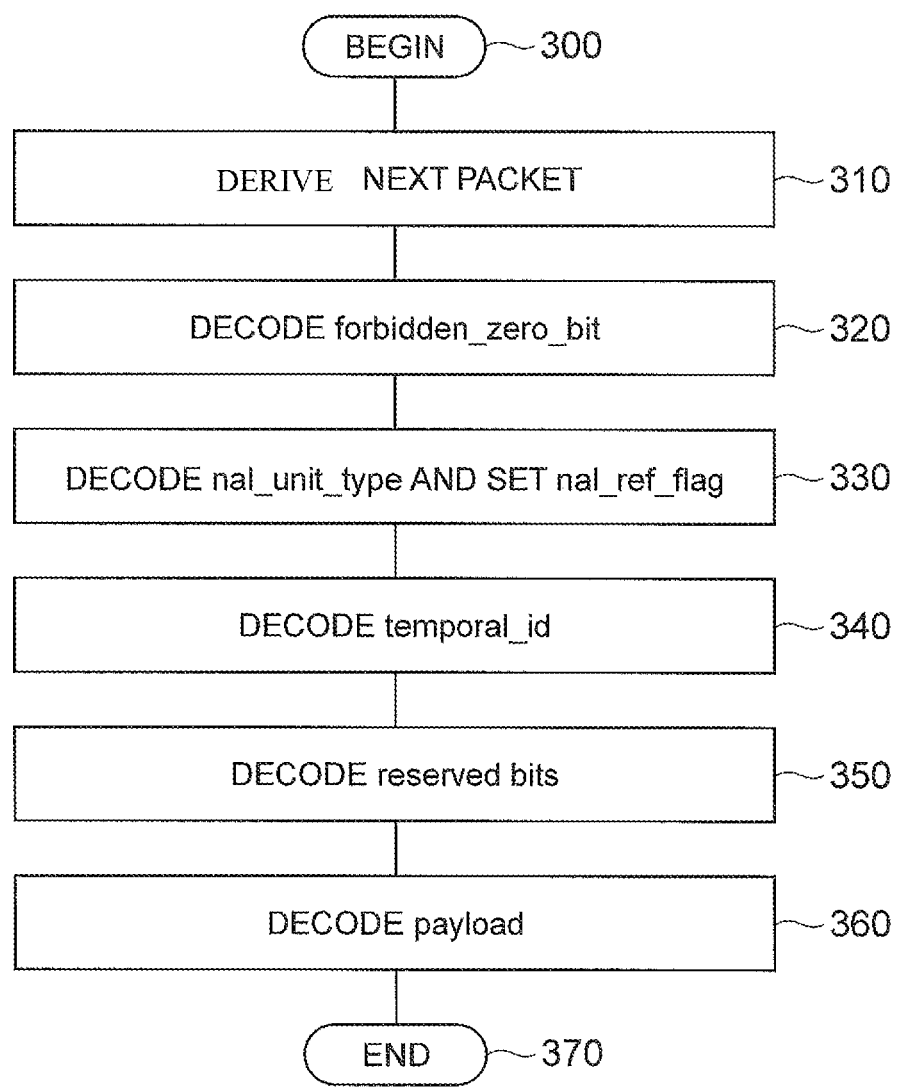
FIG. 5 is a flowchart showing an example of processing of a video predictive decoding method according to an embodiment.

FIG. 5 shows an example of operation of the video predictive decoding device for decoding of the NAL unit header in the present embodiment. In step 310, the video predictive decoding device derives a next packet for decoding. In step 320, the device decodes the first bit (forbidden_zero_bit) of the NAL unit always fixed to 0. In step 330, the device decodes nal_unit_type and sets the value of nal_ref_flag. In step 340 the device decodes temporal_id and in step 350 the device decodes the reserved five bits (reserved_one_5 bits) to complete the NAL unit header. In step 360 the device reads out the remaining payload from the packet and then terminates the processing.

Figure 6:
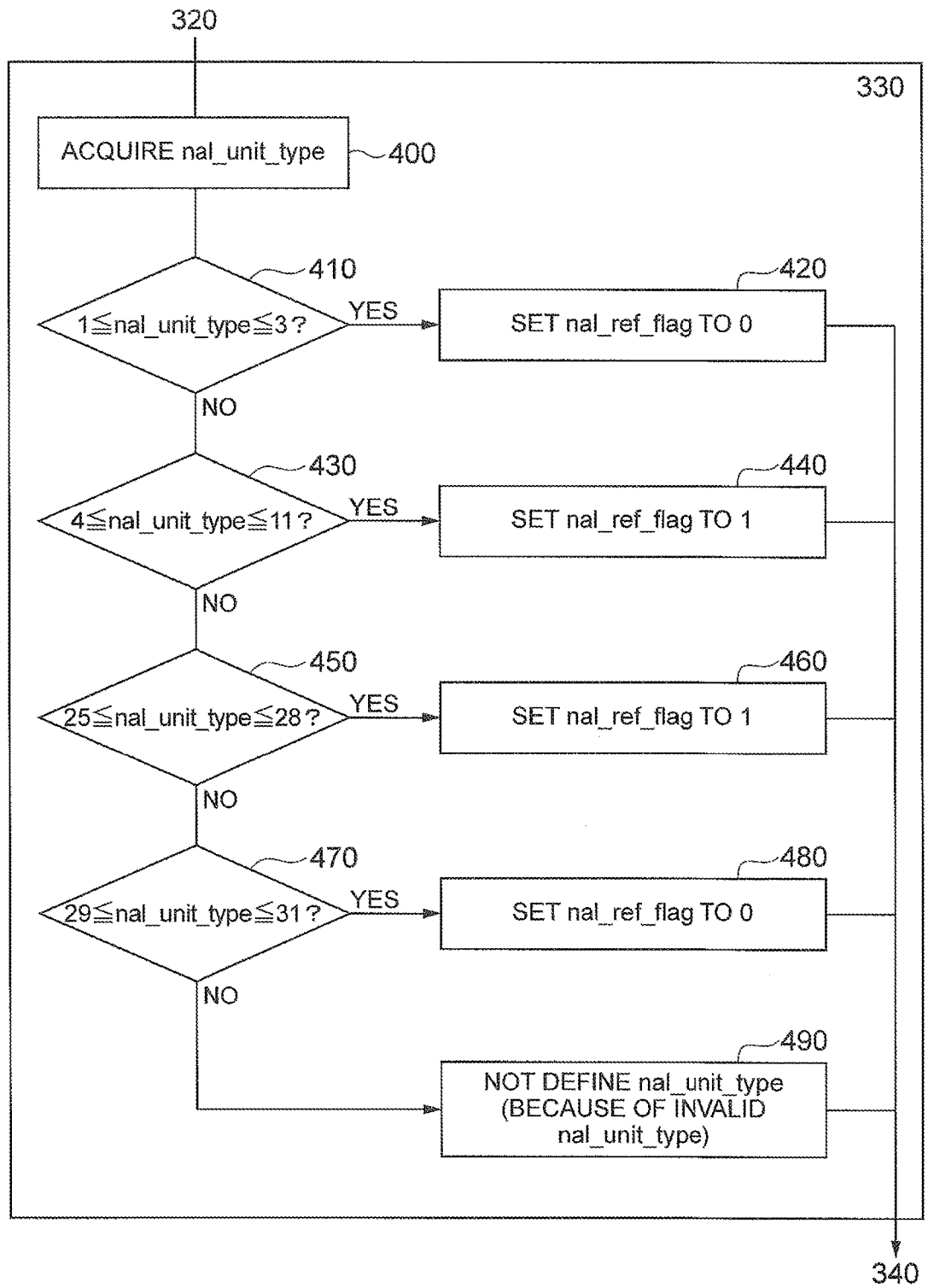
FIG. 6 is a flowchart showing an example of a detailed part of processing of the video predictive decoding method according to an embodiment.

FIG. 6 shows the details of an example of a process in the decoding of nal_unit_type and the setting of the value of nal_ref_flag in step 330 above.

In step 400, the video predictive decoding device decodes the NAL unit header to derive the value of nal_unit_type.

In step 410, the video predictive decoding device determines whether the value of nal_unit_type is a number from 1 to 3, and when the value is any one of 1 to 3 (YES), the NAL unit includes one of the coded slices of non-reference pictures and therefore the device moves to step 420. If value of nal_unit_type is not a number from 1 to 3 (NO), the device moves to step 430.

In step 420, the video predictive decoding device sets the value of nal_ref_flag to 0 and then moves to step 340.

In step 430, the video predictive decoding device determines whether the value of nal_unit_type is a number from 4 to 11, and when the value is any one of 4 to 11 (YES), the NAL unit includes one of the coded slices of random access pictures or coded slices of reference pictures, and therefore the device moves to step 440. If the value of nal_unit_type is not a number from 4 to 11 (NO) the device moves to step 450.

In step 440, the video predictive decoding device sets the value of nal_ref_flag to 1 and then moves to step 340.

In step 450, the video predictive decoding device determines whether the value of nal_unit_type is a number from 25 to 28, and when the value is any one of 25 to 28 (YES), the NAL unit includes a parameter set and then the device moves to step 460. If the value of nal_unit_type is not a number from 25 to 28 (NO), the device moves to step 470.

In step 460, the video predictive decoding device sets the value of nal_ref_flag to 1 and then moves to step 340.

In step 470, the video predictive decoding device determines whether the value of nal_unit_type is a number from 29 to 31, and when the value is any one of 29 to 31 (YES), the NAL unit includes information data and then the device moves to step 480. If the value of nal_unit_type is not a number from 29 to 31 (NO), nal_unit_type is an invalid value and the device moves to step 490.

In step 480, the video predictive decoding device sets the value of nal_ref_flag to 0 and then moves to step 340.

In step 490, the video predictive decoding device determines that the value of nal_ref_flag is undefined, and then the device moves to step 340.

In the present embodiment the aforementioned setting of nal_ref_flag is performed through the logical determination, but in other embodiments, the value of nal_ref_flag may also be set using a reference table of nal_ref_flag against index of nal_unit_type. Table 5 is an example of the reference table of nal_ref_flag against index of nal_unit_type.

TABLE 5

| NAL unit type range | Inferred value of nal_ref_flag |
| --- | --- |
| 1 to 3 | 0 |
| 4 to 11 | 1 |
| 25 to 28 | 1 |
| 29 to 31 | 0 |

In Table 5, the thirty two entries of nal_ref_flag are set to the same values as in the last column of Table 4.

The aforementioned nal_ref_flag estimation or setting method is not limited to the video predictive decoding device but can also be applied to the MANEs.

In the present embodiment the video predictive decoding device may select not performing the setting of nal_ref_flag and may directly use the value of nal_unit_type in determining whether a decoded picture is a reference picture. This can be explained as follows by use of a logical expression. When nal_unit_type of the relevant picture is 1, 2, or 3, the relevant picture is a non-reference picture.

Otherwise, the relevant picture is a reference picture and is stored for use as reference of another picture.

In the present embodiment the definition of reference picture and non-reference picture is applied to the entire video data. However, in embodiments where the video data is subjected to a selective frame drop process to discard pictures in a higher temporal layer, this definition may no longer be accurate.

Under such circumstances, some reference pictures can be pictures that are not used for reference. To avoid this situation, in some embodiments the reference pictures with nal_unit_type of 9, 10, and 11 and the non-reference pictures with nal_unit_type of 1, 2, and 3 may be defined as described below.

A reference picture is a picture to be used for inter prediction by any other picture in the same temporal layer as the foregoing picture.

A non-reference picture is a picture that is not to be used for inter prediction by any other picture in the same temporal layer as the foregoing picture.

In a method, such as the method described in Benjamin Bross et al., "High efficiency video coding (HEVC) text specification draft 7," Joint Collaborative Team on Video Coding (JCT-VC) of ITU-T SG16 WP3 and ISO/IEC JTC1/SC29/WG11, 9th Meeting: Geneva, CH, 27 Apr.-7 May 2012, the inter prediction is instructed by a content of a reference picture set (RPS) to define which pictures can be used for inter prediction. For this reason, the foregoing definition may be described as follows.

A non-reference picture (with nal_unit_type of 1, 2, or 3) is not included in the RPS of any other picture in the same temporal layer as the foregoing picture.

A reference picture (with nal_unit_type of 9, 10, or 11) is included in the RPS of any other picture in the same temporal layer as the foregoing picture.

A video predictive encoding program and a video predictive decoding program can be used as part of the video predictive coding system to enable at least some functions of the modules of the foregoing video predictive encoding device and video predictive decoding device. The video predictive encoding program and video predictive decoding program can be provided as programs stored in a storage medium. Examples of such storage media include disks, CD-ROMs, DVDs, and ROMs, semiconductor memories, and so on.

Figure 7:
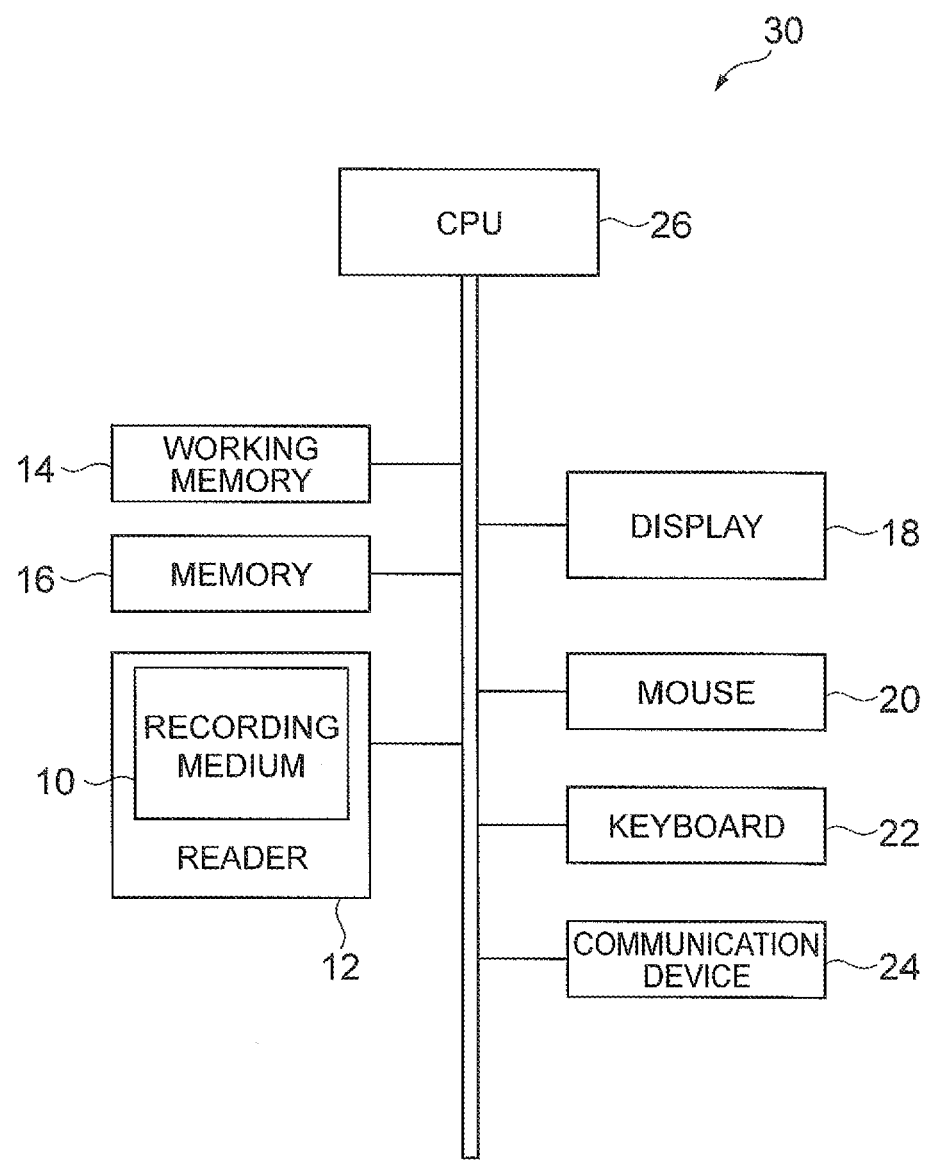
FIG. 7 is a hardware configuration of an example of a computer for executing a program stored in a storage medium.
Figure 8:
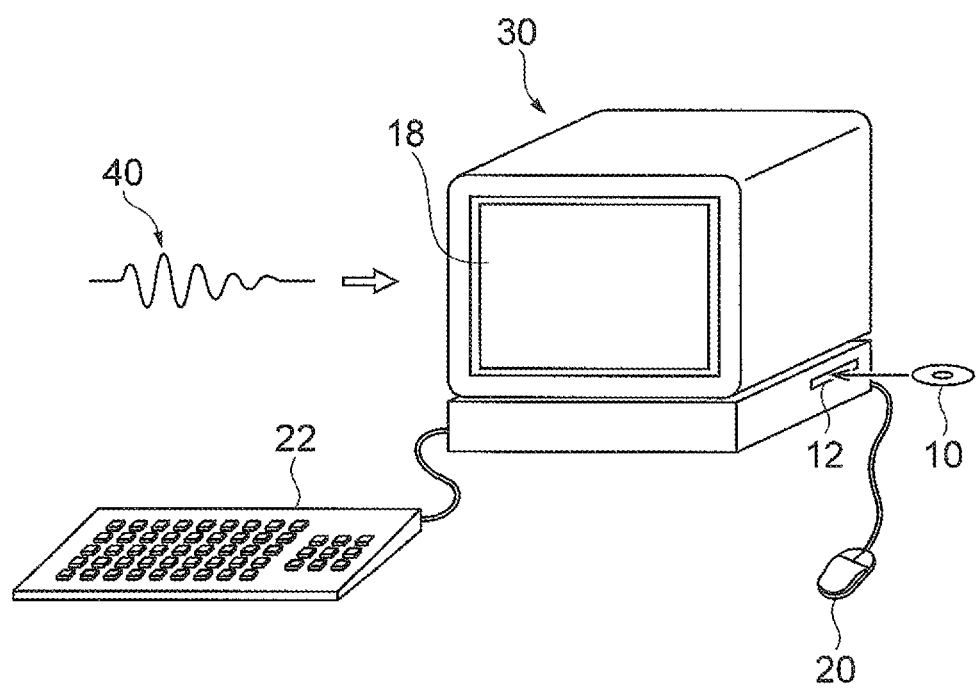
FIG. 8 is a perspective view of an example of a computer for executing a program stored in a storage medium.

FIG. 7 is a drawing showing an example of a hardware circuitry configuration of a computer for executing a program stored in a storage medium and FIG. 8 is an example of a perspective view of a computer for executing a program stored in a storage medium. The computer can be embodied in a DVD player, a set-top box, a cell phone, etc., provided with a central processing unit (CPU), and be configured to perform processing and control by software.

As shown in FIG. 7, the computer 30 is provided with circuitry that includes a reading device 12 such as a disk drive unit, a CD-ROM drive unit, or a DVD drive unit, a communication port such as a universal serial bus port (USB), Bluetooth port, an infrared communication port, or any other type of communication port that allows communication with an external device, such as another computer or memory device. The computer 30 may also include a working memory 14 that may include an operating system, a memory 16 that stores data, such as at least part of programs stored in the storage medium 10. In addition, the working memory 14 and/or the memory 16 may include the memory 14 and the memory 13. The working memory 14 and memory 16 may be one or more computer readable storage medium that is other than a transitory signal, and can include a solid-state memory such as a memory card or other package that houses one or more non-volatile memories, such as read-only memories. Further, the computer readable medium can include a random access memory or other volatile re-writable memory. Additionally or alternatively, the computer-readable medium can include a magneto-optical or optical medium, such as a disk or tapes or any other non-transitory information storage medium to capture carrier wave signals such as a signal communicated over a transmission medium. A digital file attachment to an e-mail, stored in a storage medium, or other self-contained information archive or set of archives may be considered a non-transitory distribution medium that is a tangible computer readable storage medium. Accordingly, the embodiments are considered to include any one or more of a computer-readable storage medium or a non-transitory distribution storage medium and other equivalents and successor information storage media, in which data or instructions may be stored. In addition, the computer 30 may have user interface circuitry that includes, a monitor unit 18 like a display, a mouse 20 and a keyboard 22 as input devices, a touch screen display, a microphone for receipt of voice commands, a sensor, or any other mechanism or device that allows a user to interface with the computer 30. In addition, the circuitry of the computer 30 may include a communication device 24 for transmission and reception of data or the like, and a CPU 26, or processor, for controlling execution of programs. The processor 26 may be one or more one or more general processors, digital signal processors, application specific integrated circuits, field programmable gate arrays, digital circuits, analog circuits, combinations thereof, and/or other now known or later developed circuitry and devices for analyzing and processing data. In an example, when the storage medium 10 is put into the reading device 12, the computer 30 becomes accessible to the video predictive encoding or decoding program stored in the storage medium 10, through the reading device 12 and becomes able to operate as the video predictive encoding or decoding device, based on the video predictive encoding or decoding program.

As shown in FIG. 8, the video predictive encoding program or the video predictive decoding program may be provided in the form of computer data signal 40 superimposed on a carrier wave, through a network. In this case, the computer 30 can execute the video predictive encoding program or the video predictive decoding program after the video predictive encoding program or the video predictive decoding program is received by the communication device 24 and is stored into the memory 16.

Figure 9:
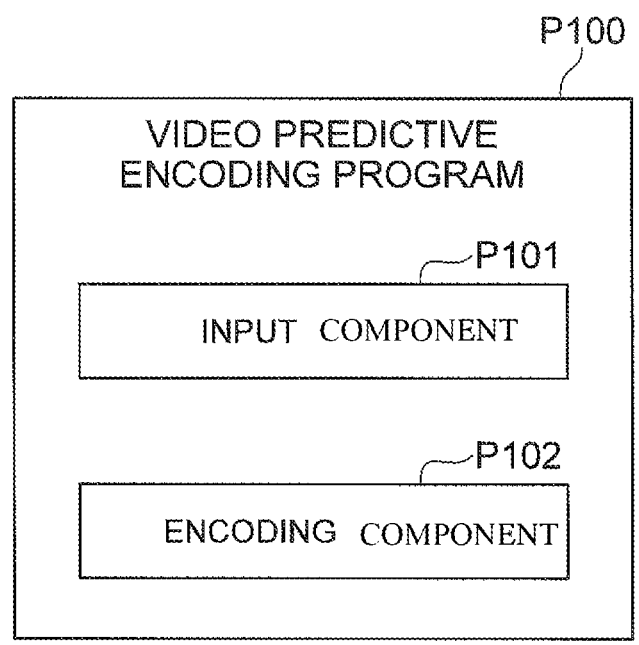
FIG. 9 is a block diagram showing a configuration example of a video predictive encoding program.

Specifically, as shown in FIG. 9, the video predictive encoding program P100 is a video predictive encoding program provided with an input component P101 that can be executed during receipt of input of a plurality of pictures forming a video sequence, and an encoding component P102 that can be executed during encoding of the pictures by either the intra prediction or the inter prediction to generate compressed picture data, and during packetization of the compressed picture data with packet header information, wherein the packet header information contains a picture type and wherein the encoding component P102 can also be executed during the determination of the picture type so as to uniquely indicate whether encoded picture data is used for reference in decoding of another picture.

Figure 10:
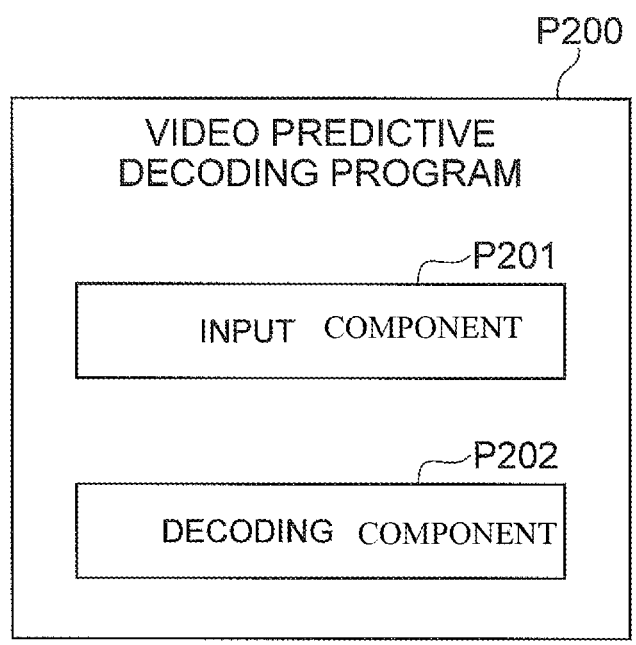
FIG. 10 is a block diagram showing a configuration example of a video predictive decoding program.

Similarly, as shown in FIG. 10, the video predictive decoding program P200 is a video predictive decoding program provided with an input component P201 that can be executed during receipt of compressed picture data resulting from encoding of a plurality of pictures forming a video sequence by either the intra prediction or the inter prediction and packetization thereof along with packet header information, and a decoding component P202 that can be executed during reconstruction of the packet header information and the compressed picture data, wherein the packet header information contains a picture type to uniquely indicate whether reconstructed picture data is used for reference in decoding of another picture and wherein the decoding component P202 can be executed during the determination, based on the picture type, whether reconstructed picture data is used for reference in decoding of another picture.

The decoding component P202 may also be executed during the determination whether reconstructed picture data is used for reference in decoding of another picture, based on a correspondence table in which the picture type is previously stored in association with information indicative of whether reconstructed picture data is used for reference in decoding of another picture.

LIST OF REFERENCE SIGNS

101 input terminal; 102 block partition module; 103 predicted signal generation module; 104 frame memory; 105 subtraction module; 106 transform module; 107 quantization module; 108 de-quantization module; 109 inverse transform module; 110 addition module; 111 entropy encoding module; 112 output terminal; 113 input terminal; 201 input terminal; 202 data analysis module; 203 de-quantization module; 204 inverse transform module; 205 addition module; 206 output terminal; 207 frame memory; 208 predicted signal generation module.

The invention claimed is:

1. A video predictive encoding device comprising:
an input module executable to receive a plurality of pictures forming a video sequence, the plurality of pictures being separated into a plurality of temporal layers; and
an encoding module executable to encode a received picture to generate a compressed form of the picture, and encapsulate the compressed form of the picture in a network abstraction layer (NAL) unit with NAL unit header information,
wherein
the NAL unit header information includes a nal_unit_type that is variable to define different types of pictures and assign a first definition or a second definition, which is different from the first definition, to one picture of the video sequence so that with a selective assignment of the first or second definition to said one picture, the nal_unit_type is operable to (i) independently identify said one picture to be either a reference picture referenced in a prediction process by another picture of the video sequence residing in a temporal layer in which said one picture resides or a non-reference picture not referenced by any picture of the video sequence residing in the temporal layer and (ii) generate information to store only said reference picture in a memory, and
wherein the encoding module is executable to: determine whether said one picture is a reference picture referenced in a prediction process by another picture of the video sequence residing in the temporal layer or a non-reference picture not referenced by any picture of the video sequence residing in the temporal layer; in response to a determination that said one picture is a reference picture referenced in a prediction process by another picture of the video sequence residing in the temporal layer, define the nal_unit_type to assign said one picture the first definition; and in response to a determination that said one picture is a non-reference picture not referenced in a prediction process by any picture of the video sequence residing in the temporal layer, define the nal_unit_type to assign said one picture the second definition.

2. A video predictive decoding device comprising:
an input module executable to receive a compressed form of a plurality of pictures forming a video sequence, the plurality of pictures being separated into a plurality of temporal layers, wherein the compressed form of a picture is encapsulated in a network abstraction layer (NAL) unit with NAL unit header information; and
a decoding module executable to decode the NAL unit including the NAL unit header information and the compressed form of an encapsulated picture in the NAL unit,
wherein
the NAL unit header information includes a nal_unit_type that is variable to define different types of pictures and assign a first definition or a second definition, which is different from the first definition, to the encapsulated picture of the video sequence so that with a selective assignment of the first or second definition to the encapsulated picture, the nal_unit_type is operable to (i) independently identify the encapsulated picture to be either a reference picture referenced in a prediction process by another picture of the video sequence residing in a temporal layer in which the encapsulated picture resides or a non-reference picture not referenced by any picture of the video sequence residing in the temporal layer and (ii) generate information to store only said reference picture in a memory, and
wherein the decoding module is executable to: determine a definition defined in the nal_unit_type of the encapsulated picture; in response to a determination that the nal_unit_type assigns the encapsulated picture the first definition, allow the encapsulated picture to be used as a reference picture to decode another picture of the video sequence residing in the temporal layer and store only the encapsulated picture in the memory for decoding; and in response to a determination that the nal_unit_type assigns the encapsulated picture the second definition, disallow the encapsulated picture to be used as a reference picture to decode any picture of the video sequence residing in the temporal layer.

3. A video predictive encoding method comprising:
an input step of receiving a plurality of pictures forming a video sequence, the plurality of pictures being separated into a plurality of temporal layers; and
an encoding step of encoding a received picture to generate a compressed form of the picture, and encapsulating the compressed form of the picture in a network abstraction layer (NAL) unit with NAL unit header information,
wherein
the NAL unit header information includes a nal_unit_type that is variable to define different types of pictures and assign a first definition or a second definition, which is different from the first definition, to one picture of the video sequence so that with a selective assignment of the first or second definition to said one picture, the nal_unit_type is operable to (i) independently identify said one picture to be either a reference picture referenced in a prediction process by another picture of the video sequence residing in a temporal layer in which said one picture resides or a non-reference picture not referenced by any picture of the video sequence residing in the temporal layer and (ii) generate information to store only said reference picture in a memory, and wherein the encoding step further comprises: determining whether said one picture is a reference picture referenced in a prediction process by another picture of the video sequence residing in the temporal layer or a non-reference picture not referenced by any picture of the video sequence residing in the temporal layer; in response to a determination that said one picture is a reference picture referenced in a prediction process by another picture of the video sequence residing in the temporal layer, defining the nal_unit_type to assign said one picture the first definition; and in response to a determination that said one picture is a non-reference picture not referenced in a prediction process by any picture of the video sequence residing in the temporal layer, defining the nal_unit_type to assign said one picture the second definition.

4. A video predictive decoding method comprising:

an input step of receiving a compressed form of a plurality of pictures forming a video sequence, the plurality of pictures being separated into a plurality of temporal layers, wherein the compressed form of a picture is encapsulated in a network abstraction layer (NAL) unit with NAL unit header information; and a decoding step of decoding the NAL unit including the NAL unit header information and the compressed form of an encapsulated picture in the NAL unit, wherein the NAL unit header information includes a nal_unit_type that is variable to define different types of pictures and assign a first definition or a second definition, which is different from the first definition, to the encapsulated picture of the video sequence so that with a selective assignment of the first or second definition to the encapsulated picture, the nal_unit_type is operable to (i) independently identify the encapsulated picture to be either a reference picture referenced in a prediction process by another picture of the video sequence residing in a temporal layer in which the encapsulated picture resides or a non-reference picture not referenced by any picture of the video sequence residing in the temporal layer and (ii) generate information to store only said reference picture in a memory, and wherein the decoding step further comprises: determining a definition defined in the nal_unit_type of the encapsulated picture; in response to a determination that the nal_unit_type assigns the encapsulated picture the first definition, allowing the encapsulated picture to be used as a reference picture to decode another picture of the video sequence residing in the temporal layer and storing only the encapsulated picture in the memory for decoding; and in response to a determination that the nal_unit_type assigns the encapsulated picture the second definition, disallowing the encapsulated picture to be used as a reference picture to decode any picture of the video sequence residing in the temporal layer.

5. A non-transitory computer readable storage medium comprising instructions executed by a computer for video predictive encoding, the computer readable storage medium comprising:

instructions executable to receive a plurality of pictures forming a video sequence, the plurality of pictures being separated into a plurality of temporal layers;

instructions executable to encode a received picture to generate a compressed form of the picture, and encapsulate the compressed form of the picture in a network abstraction layer (NAL) unit with NAL unit header information, wherein the NAL unit header information includes a nal_unit_type that is variable to define different types of pictures and assign a first definition or a second definition, which is different from the first definition, to one picture of the video sequence so that with a selective assignment of the first or second definition to said one picture, the nal_unit_type is operable to (i) independently identify said one picture to be either a reference picture referenced in a prediction process by another picture residing in a temporal layer in which said one picture resides or a non-reference picture not referenced by any picture of the video sequence residing in the temporal layer and (ii) generate information to store only said reference picture in a memory, and instructions executable to encode the pictures further comprise instructions executable to: determine whether said one picture is a reference picture referenced in a prediction process by another picture of the video sequence residing in the temporal layer or a non-reference picture not referenced by any picture of the video sequence residing in the temporal layer; in response to a determination that said one picture is a reference picture referenced in a prediction process by another picture of the video sequence residing in the temporal layer, define the nal_unit_type to assign said one picture the first definition; and in response to a determination that said one picture is a non-reference picture not referenced in a prediction process by any picture of the video sequence residing in the temporal layer, define the nal_unit_type to assign said one picture the second definition.

6. A non-transitory computer readable storage medium comprising instructions executed by a computer for video predictive decoding, the computer readable storage medium comprising:

instructions executable to receive a compressed form of a plurality of pictures forming a video sequence, the plurality of pictures being separated into a plurality of temporal layers, wherein the compressed form of a picture is encapsulated in a network abstraction layer (NAL) unit with NAL unit header information; and instructions executable to decode the NAL unit including the NAL unit header information and the compressed form of an encapsulated picture in the NAL unit, wherein the NAL unit header information includes a nal_unit_type that is variable to define different types of pictures and assign a first definition or a second definition, which is different from the first definition, to the encapsulated picture of the video sequence so that with a selective assignment of the first or second definition to the encapsulated picture, the nal_unit_type is operable to (i) independently identify the encapsulated picture to be either a reference picture referenced in a prediction process by another picture of the video sequence residing in a temporal layer in which the encapsulated picture resides or a non-reference picture not referenced by any picture of the video sequence residing in the temporal layer and (ii) generate information to store only said reference picture in a memory, and wherein the instructions executable to: determine a definition defined in the nal_unit_type of the encapsulated picture, in response to a determination that the nal_unit_type assigns the encapsulated picture the first definition, allow the encapsulated picture to be used as a reference picture to decode another picture of the video sequence residing in the temporal layer and store only the encapsulated picture in the memory for decoding; and in response to a determination that the nal_unit_type assigns the encapsulated picture the second definition, disallow the encapsulated picture to be used as a reference picture to decode any picture of the video sequence residing in the temporal layer.

* * * * *